(12) United States Patent
Yoo (10) Patent No.: US 12,412,098 B2
(45) Date of Patent: Sep. 9, 2025

(54) APPARATUS AND METHOD FOR NEURAL ARCHITECTURE SEARCHING WITH TARGET DATA

(71) Applicants: Samsung Electronics Co., Ltd., Suwon-si (KR); SNU R&DB FOUNDATION, Seoul (KR)

(72) Inventor: Sungjoo Yoo, Seoul (KR)

(73) Assignees: Samsung Electronics Co., Ltd., Suwon-si (KR); SNU R&DB FOUNDATION, Seoul (KR)

(*) Notice: Subject to any disclaimer, the term of this patent is extended or adjusted under 35 U.S.C. 154(b) by 1051 days.

(21) Appl. No.: 17/384,050

(22) Filed: Jul. 23, 2021

(65) Prior Publication Data

US 2022/0284302 A1 Sep. 8, 2022

(30) Foreign Application Priority Data

Mar. 4, 2021 (KR) .................. 10-2021-0028924
Mar. 17, 2021 (KR) .................. 10-2021-0034493

(51) Int. Cl.
*G06N 3/088* (2023.01)
*G06N 3/045* (2023.01)

(52) U.S. Cl.
CPC ............ *G06N 3/088* (2013.01); *G06N 3/045* (2023.01)

(58) Field of Classification Search
CPC .............................. G06N 3/088; G06N 3/045
See application file for complete search history.

(56) References Cited

U.S. PATENT DOCUMENTS

| | | | |
|---|---|---|---|
| 10,592,725 B2* | 3/2020 | Lim | G06N 3/04 |
| 10,671,564 B2 | 6/2020 | Henry et al. | |
| 2021/0124881 A1* | 4/2021 | Li | G06F 40/30 |
| 2022/0188636 A1* | 6/2022 | Pham | G06N 3/08 |

FOREIGN PATENT DOCUMENTS

| | | |
|---|---|---|
| CN | 111563592 A | 8/2020 |
| CN | 111639753 A | 9/2020 |
| CN | 111738418 A | 10/2020 |
| JP | 2020-502683 A | 1/2020 |
| KR | 10-2020-0052439 A | 5/2020 |

OTHER PUBLICATIONS

Liu, et al. "Are Labels Necessary for Neural Architecture Search?" *European Conference on Computer Vision.* Springer, Cham, Aug. 3, 2020. (pp. 1-19).

(Continued)

*Primary Examiner* — Li Wu Chang
(74) *Attorney, Agent, or Firm* — NSIP Law (57) ABSTRACT

A method and apparatus with neural architecture search are provided. A processor-implemented method includes obtaining target data, sampling a trained first neural network into a plurality of second neural networks, training each of the second neural networks based on a portion of the target data, and selecting a second neural network satisfying a predetermined condition among the trained second neural networks for performing an inference operation.

34 Claims, 6 Drawing Sheets

(56) References Cited

OTHER PUBLICATIONS

Sun, et al. "Test-Time Training with Self-Supervision for Generalization under Distribution Shifts." *International Conference on Machine Learning.* PMLR, vol. 119, 2020. (pp. 1-20).

Chen, et al. "A Simple Framework for Contrastive Learning of Visual Representations." *International conference on machine learning.* PMLR, vol. 119, 2020. (pp. 1-11).

Grill, Jean-Bastien, et al. "Bootstrap Your Own Latent: A New Approach to Self-Supervised Learning" *arXiv preprint arXiv:2006.07733* Sep. 10, 2020. (pp. 1-35).

Sohn, Kihyuk, et al. "Fixmatch: Simplifying Semi-Supervised Learning with Consistency and Confidence." *arXiv preprint arXiv:2001.07685* (2020). (pp. 1-21).

Cal, Han, et al. "Once-for-all: Train one network and specialize it for efficient deployment." *arXiv preprint arXiv:1908.09791* Apr. 29, 2020. (pp. 1-15).

Shazeer, Noam, et al. "Outrageously Large Neural Networks: The Sparsely-Gated Mixture-Of-Experts Layer." *arXiv preprint arXiv:1701.06538* Jan. 23, 2017. (pp. 1-19).

Sharma, Hardik, et al. "Bit Fusion: Bit-Level Dynamically Composable Architecture For Accelerating Deep Neural Network." *2018 ACM/IEEE 45th Annual International Symposium on Computer Architecture (ISCA).* IEEE, May 30, 2018. (pp. 1-12).

Park, Eunhyeok, et al. "Energy-Efficient Neural Network Accelerator Based on Outlier-Aware Low-Precision Computation." *2018 ACM/IEEE 45th Annual International Symposium on Computer Architecture (ISCA),* IEEE, 2018. (pp. 1-11).

Voss, Chelsea, et al. "Branch Specialization." *Distill* 6.4, Apr. 5, 2021: e00024-008. (pp. 1-11).

* cited by examiner

APPARATUS AND METHOD FOR NEURAL ARCHITECTURE SEARCHING WITH TARGET DATA

CROSS-REFERENCE TO RELATED APPLICATIONS

This application claims the benefit under 35 U.S.C. § 119(a) of Korean Patent Application No. 10-2021-0028924 filed on Mar. 4, 2021, and Korean Patent Application No. 10-2021-0034493 filed on Mar. 17, 2021, respectively in the Korean Intellectual Property Office, the entire disclosures of which are incorporated herein by reference for all purposes.

BACKGROUND

1. Field

The following description relates to an apparatus and method with a neural architecture search (NAS).

2. Description of Related Art

Recently, electronic devices for providing various experiences using neural network technologies such as deep learning are being developed. As non-limiting examples, neural networks have been utilized performances of segmentation, super-resolution, or a high dynamic range (HDR).

Image quality enhancement using a neural network may be implemented in hardware through a digital circuit design as a register-transfer level (RTL), or implemented using various types of processors, for example, a central processing unit (CPU), a digital signal processor (DSP), a graphics processing unit (GPU), or an NPU, which may be specialized to perform fixedly trained neural network operations to quickly output image quality enhancement results with potentially better performance in comparison to the other types of processors.

SUMMARY

This Summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter.

In one general aspect, a processor-implemented method includes obtaining target data, sampling a trained first neural network into a plurality of second neural networks, training each of the second neural networks based on a portion of the target data, and selecting a second neural network satisfying a predetermined condition among the trained second neural networks for performing an inference operation.

The method may further include training the selected second neural network based on the target data.

The training of the selected second neural network may include training the selected second neural network using the first neural network.

The method may further include implementing the inference operation using the trained selected second neural network.

The training of the selected second neural network using the first neural network may include performing teacher learning on the selected second neural network based on the first neural network by using the first neural network as a teacher network and using the selected second neural network as a student network.

The training of each of the second neural networks may include training each of the second neural networks without labels corresponding to the target data.

The training of each of the second neural networks may include training an architecture parameter of each of the second neural networks using respective outputs obtained by inputting the portion of the target data to each of the second neural networks.

The training of each of the second neural networks may include performing a self-supervised learning task on each of the second neural networks using the portion of the target data, and training an architecture parameter of each of the second neural networks based on respective results obtained by performing the self-supervised learning task.

The training of each of the second neural networks may include performing a semi-supervised learning task on each of the second neural networks using the portion of the target data, and training an architecture parameter of each of the second neural networks based on respective results obtained by performing the semi-supervised learning task.

The training of each of the second neural networks may include performing a self-supervised learning task on at least one of the second neural networks using the portion of the target data, training an architecture parameter of the at least one of the second neural networks based on respective results obtained by performing the self-supervised learning task, performing a semi-supervised learning task on another at least one of the second neural networks using the portion of the target data, and training an architecture parameter of the other at least one of the second neural networks based on respective results obtained by performing the semi-supervised learning task.

The selecting of the second neural network may include classifying which one or more second neural networks satisfy a quality condition among the trained second neural networks, evaluating the one or more second neural networks that satisfy the quality condition based on at least one of a performance condition and an energy consumption condition, and selecting the second neural network based on a result of the evaluating.

The method may further include, using one or more processors, executing instructions that cause the one or more processors to obtain the target data and the trained first neural network from one or more memories, perform the sampling of the trained first neural network, perform the training of each of the second neural networks, and perform the selecting of the second neural network.

The method may further include implementing the inference operation using the selected second neural network.

In one general aspect, one or more embodiments include a non-transitory computer-readable storage medium storing instructions that, when executed by one or more processors, cause the one or more processors to perform any one, any combination, or all operations and/or methods described herein.

In one general aspect, a neural network apparatus includes one or more processors configured to obtain target data, sample a trained first neural network into a plurality of second neural networks, train each of the second neural networks based on a portion of the target data, and perform a selection, from among the trained second neural networks, of a second neural network that satisfies a predetermined condition for performing an inference operation.

The one or more processors may be further configured to train the selected second neural network based on the target data.

For the training of the selected second neural network, the one or more processors may be configured to train the selected second neural network using the first neural network.

The apparatus may further include implementing the inference operation using the trained selected second neural network.

For the training of the selected second neural network using the first neural network, the one or more processors may be configured to perform teacher learning on the selected second neural network based on the first neural network by using the first neural network as a teacher network and using the selected second neural network as a student network.

For the training of each of the second neural networks, the one or more processors may be configured to train each of the second neural networks without labels corresponding to the target data.

For the training of each of the second neural networks, the one or more processors may be configured to train an architecture parameter of each of the second neural networks using respective outputs obtained by inputting the portion of the target data to each of the second neural networks.

For the training of each of the second neural networks, the one or more processors may be configured to perform a self-supervised learning task on each of the second neural networks using the portion of the target data, and to train an architecture parameter of each of the second neural networks based on respective results obtained by performing the self-supervised learning task.

For the training of each of the second neural networks, the one or more processors may be configured to perform a semi-supervised learning task on each of the second neural networks using the portion of the target data, and to train an architecture parameter of each of the second neural networks based on respective results obtained by performing the semi-supervised learning task.

For the training of each of the second neural networks, the one or more processors may be configured to perform a self-supervised learning task on at least one of the second neural networks using the portion of the target data, train an architecture parameter of the at least one of the second neural networks based on respective results obtained by performing the self-supervised learning task, perform a semi-supervised learning task on another at least one of the second neural networks using the portion of the target data, and train an architecture parameter of the other at least one of the second neural networks based on respective results obtained by performing the semi-supervised learning task.

For the selection of the second neural network, the one or more processors may be configured to classify which one or more second neural networks satisfy a quality condition among the trained second neural networks, to evaluate the second neural networks satisfying the quality condition based on at least one of a performance condition and an energy consumption condition, and to select the second neural network based on a result of the evaluation.

The apparatus may further include one or more memories, including at least one of the one or more memories storing instructions, which when executed by the one or more processors, configure the one or more processors to obtain the target data and the trained first neural network from at least one of the one or more memories, perform the sampling of the trained first neural network, perform the training of each of the second neural networks, and perform the selecting of the second neural network.

The stored instructions, which when executed by the one or more processors, may configure the one or more processors to implement the inference operation using the selected second neural network, where the inference operation is a classification of information about image data input to the selected second neural network.

The apparatus may be a mobile device.

In one general aspect, a mobile device includes one or more processors, and one or more memories including instructions, which when executed by the one or more processors, configure the one or more processors to sample a trained first neural network into a plurality of second neural networks, train each of the second neural networks based on a portion of unlabeled target image data, perform a selection, from among the trained second neural networks, of a second neural network, and generate a final second neural network by training the selected second neural network using the first neural network and the unlabeled target data.

The one or more processors may be configured to train an architecture parameter of each of the second neural networks using respective outputs obtained by inputting the portion of the target data to each of the second neural networks.

The one or more processors may be further configured to implement an inference operation using the generated final second neural network, where the inference operation is a classification of information about image data input to the final second neural network.

For the training of the selected second neural network using the first neural network, the one or more processors may be configured to perform teacher learning on the selected second neural network based on the first neural network by using the first neural network as a teacher network and using the selected second neural network as a student network.

For the training of each of the second neural networks, the one or more processors may be configured to perform a self-supervised learning task on each of the second neural networks using the portion of the target data, and to train an architecture parameter of each of the second neural networks based on respective results obtained by performing the self-supervised learning task.

For the training of each of the second neural networks, the one or more processors may be configured to perform a semi-supervised learning task on each of the second neural networks using the portion of the target data, and to train an architecture parameter of each of the second neural networks based on respective results obtained by performing the semi-supervised learning task.

For the selection of the second neural network, the one or more processors may be configured to classify second neural networks satisfying a quality condition among the trained second neural networks, to evaluate the second neural networks satisfying the quality condition based on at least one of a performance condition and an energy consumption condition, and to select the second neural network based on a result of the evaluation.

Other features and aspects will be apparent from the following detailed description, the drawings, and the claims.

Throughout the drawings and the detailed description, unless otherwise described or provided, the same drawing reference numerals will be understood to refer to the same or like elements, features, and structures. The drawings may not be to scale, and the relative size, proportions, and depiction of elements in the drawings may be exaggerated for clarity, illustration, and convenience.

DETAILED DESCRIPTION

The following detailed description is provided to assist the reader in gaining a comprehensive understanding of the methods, apparatuses, and/or systems described herein. However, various changes, modifications, and equivalents of the methods, apparatuses, and/or systems described herein will be apparent after an understanding of the disclosure of this application. For example, the sequences of operations described herein are merely examples, and are not limited to those set forth herein, but may be changed as will be apparent after an understanding of the disclosure of this application, with the exception of operations necessarily occurring in a certain order. Also, some descriptions of features that are known after an understanding of the disclosure of this application may be omitted for increased clarity and conciseness.

The features described herein may be embodied in different forms, and are not to be construed as being limited to the examples described herein. Rather, the examples described herein have been provided merely to illustrate some of the many possible ways of implementing the methods, apparatuses, and/or systems described herein that will be apparent after an understanding of the disclosure of this application.

The following structural or operation descriptions of examples disclosed in the present disclosure are merely intended for the purpose of describing examples, while it is also noted the examples may be implemented in various forms. The described examples are not meant to be limited to such descriptions, but it is intended that various modifications, equivalents, and alternatives are also demonstrated by the descriptions.

Although terms of "first" or "second" are used to explain various components, the components are not limited to the terms. These terms should be used only to distinguish one component from another component. For example, a "first" component may be referred to as a "second" component, or similarly, and the "second" component may be referred to as the "first" component within the scope of the right according to the concept of the present disclosure.

It will be understood that when a component is referred to as being "connected to" another component, the component can be directly connected or coupled to the other component or intervening components may be present.

The terminology used herein is for the purpose of describing particular examples only and is not to be limiting of the examples. As used herein, the singular forms "a," "an," and "the" are intended to include the plural forms as well, unless the context clearly indicates otherwise. As used herein, the term "and/or" includes any one and any combination of any two or more of the associated listed items. As used herein, the terms "include," "comprise," and "have" specify the presence of stated features, numbers, operations, elements, components, and/or combinations thereof, but do not preclude the presence or addition of one or more other features, numbers, operations, elements, components, and/or combinations thereof. The use of the term "may" herein with respect to an example or embodiment (e.g., as to what an example or embodiment may include or implement) means that at least one example or embodiment exists where such a feature is included or implemented, while all examples are not limited thereto.

Unless otherwise defined, all terms used herein including technical or scientific terms have the same meanings as those generally understood consistent with and after an understanding of the present disclosure. Terms, such as those defined in commonly used dictionaries, should be construed to have meanings matching with contextual meanings in the relevant art and the present disclosure, and are not to be construed as an ideal or excessively formal meaning unless otherwise defined herein.

It has been found that when neural networks with fixed trained structures, and performed in an NPU for example, require a same calculation time and energy consumption regardless of the characteristics of target data. Rather, while not possible with such neural networks with fixed trained structures, one or more embodiments may provide enhancements to calculation time and/or energy consumption by considering that target data may have various distributions. For example, as discussed further below, improvements in performance and/or energy consumption may be available in one or more embodiments, such as when respective structures of a neural network are optimized for corresponding target data by dynamically analyzing such distributions.

Figure 1:
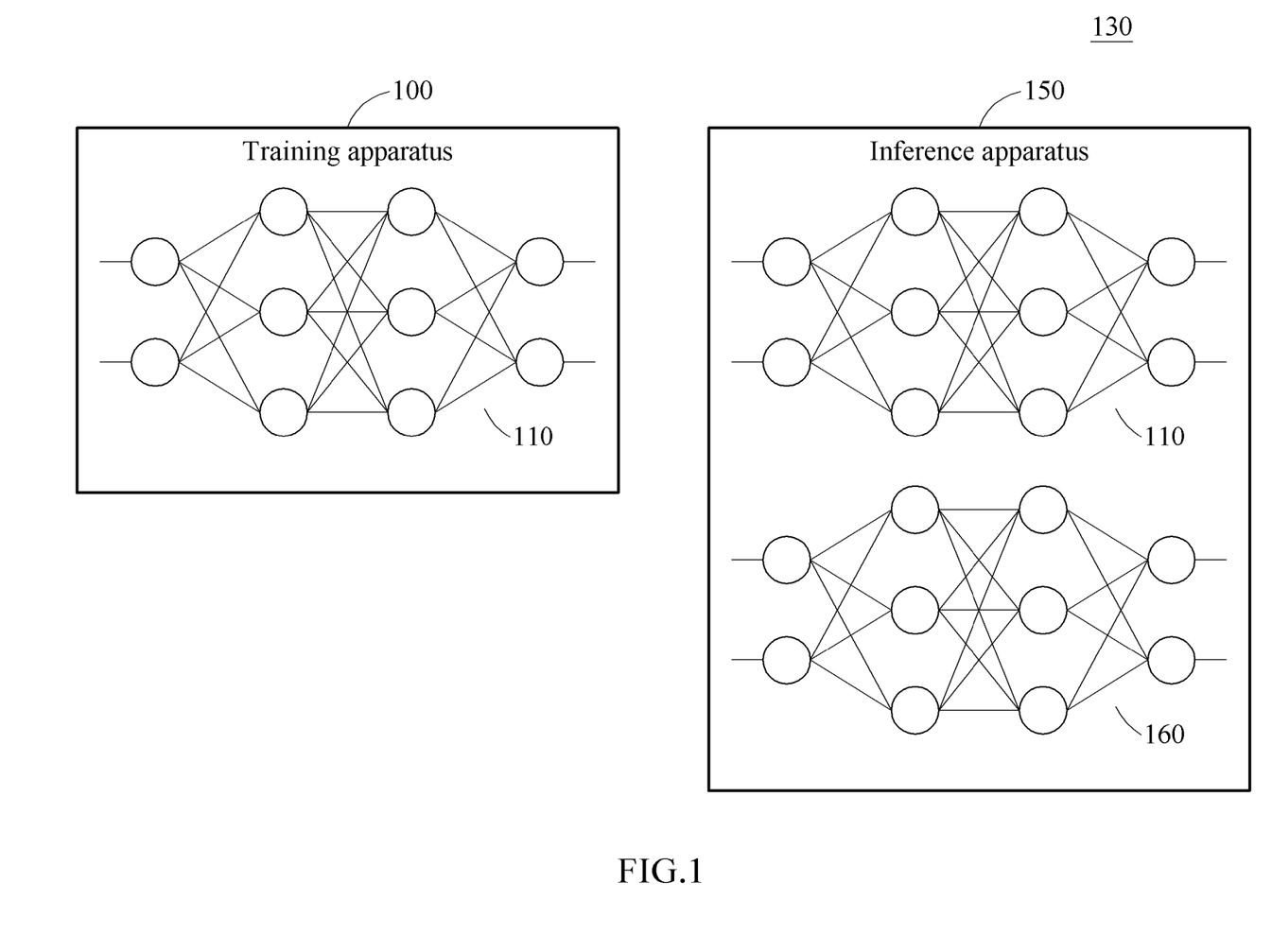
FIG. 1 illustrates an example of system with a training apparatus and an inference apparatus.

FIG. 1 illustrates an example of a system with a training apparatus and an inference apparatus.

Referring to FIG. 1, a neural network system 130 may include a training apparatus 100 having various processing capabilities, for example, operations of generating a neural network, training or learning a neural network, or retraining a neural network. As non-limiting examples, examples include the training apparatus 100 being various computing devices, for example, a server device, a personal computer (PC), or a mobile device, while other computing device examples also exist. Thus, the training apparatus 100 is representative of having one or more processors and/or specialized neural network hardware, and representative of having one or more memories storing neural networks, e.g., one or more initialized neural networks, in-training neural networks, and one or more resultant trained neural networks, as well as instructions, which when executed by the one or more processors and/or the specialized neural network hardware of the training apparatus 100, configure the one or more processors and/or the specialized neural network hardware to implement any one, any combination, or all operations and/or methods described herein.

The training apparatus 100 may generate the trained neural network 110 by implementing the training in an initialized or initial neural network and then repeatedly training the corresponding in-training neural network. Generating of the trained neural network 110 may correspond to the determining of neural network parameters. The parameters may include, for example, a variety of data, for example, input/output activations, weights or biases of the neural network, that can be stored in the one or more memories and subsequently obtained by the inference apparatus 150, and/or provided or transmitted to the inference apparatus 150. Hyperparameters may also be determined, such as indications of the number of layers, or other structural information for the ultimate trained neural network. The repetitive training of the in-training neural network may include repetitive and incremental adjusting of the parameters. For example, when the in-training neural network is repeatedly trained, the parameters of the neural network may be tuned to result in a more accurate output of the in-training neural network for a given (e.g., training) input to the in-training neural network, to resultatively generate the trained neural network 110. In the following description, the trained neural network 110 may be referred to as a "first neural network" or a super network.

As noted above, the training apparatus 100 may transmit or otherwise provide or share the trained neural network 110 to/with the inference apparatus 150. As non-limiting examples, examples include the inference apparatus 150 being various computing devices, for example, a mobile device or an embedded device, while other computing device examples also exist. For example, in an example, the inference apparatus 150 may be dedicated hardware (HW) specially configured to perform operations of neural networks. Thus, the inference apparatus 150 is representative of having one or more processors and/or specialized neural network hardware, and representative of having one or more memories storing neural networks, e.g., one or more trained neural networks 110 and one or more changed or sampled neural networks 160 as discussed in greater detail further below, as well as instructions, which when executed by the one or more processors and/or the specialized neural network hardware of the inference apparatus 150, configure the one or more processors and/or the specialized neural network hardware to implement any one, any combination, or all operations and/or methods described herein.

The inference apparatus 150 configured to implement the neural network 160 may be implemented in a separate device, e.g., independent of the training apparatus 100. However, examples are not limited thereto, and the inference apparatus 150 may also be implemented in the same device as the training apparatus 100. For example, FIG. 1 is representative of the neural network system 130 including the training apparatus 100 and the inference apparatus 150, while examples further include the system 130 being representative of at least one of the one or more processors and/or at least one of the specialized neural network hardware configured to perform both the training of the in-training neural network to generate the trained neural network 110 described herein and the inference operations using the trained neural network 110 and/or the one or more changed/sampled neural networks 160 as described herein. In such an example, the system 130 the may store both the in-training neural networks and the trained neural networks 110 in at least one same memory as utilized in the implementing of the inference operations with respect to this/these trained neural networks 110 and/or the changed/sampled neural networks 160, and one or more memories of the system 130 may also store instructions, which when executed by the one or more processors and/or the specialized neural network hardware of the system 130, configure the one or more processors and/or the specialized neural network hardware to implement any one, any combination, or all operations and/or methods described herein.

Accordingly, the inference apparatus 150 may thus implement the trained neural network 110 generated by the training apparatus 100 without change, and/or may implement the neural network 160 obtained by implementing, for example, one or more samplings of the trained neural network 110. In the following description, the neural network 160 may be referred to as a "second neural network" or a "sub-network".

Figure 2:
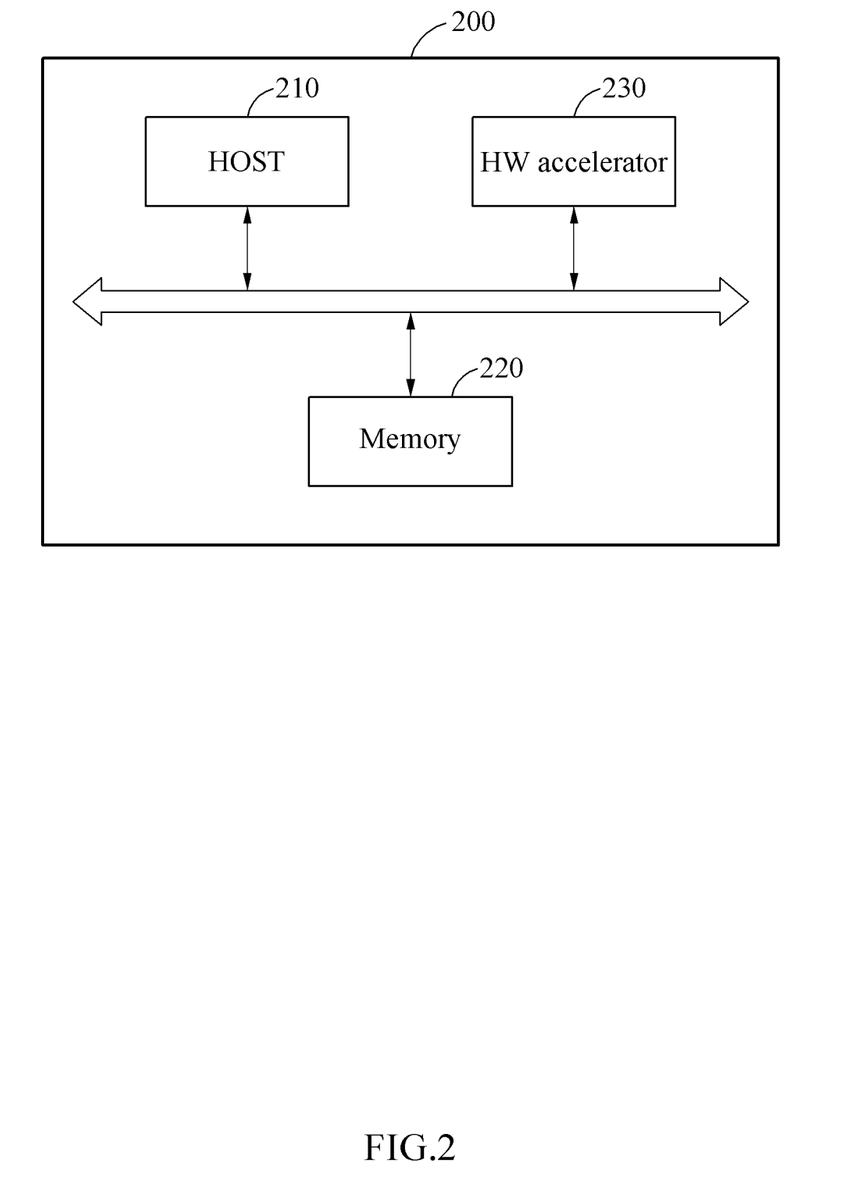
FIG. 2 illustrates an example of a neural network apparatus.

FIG. 2 illustrates an example of a neural network apparatus.

Referring to FIG. 2, a neural network apparatus 200 may include a host 210, a memory 220, and an HW accelerator 230. The neural network apparatus 200 may correspond to the inference apparatus 150 of FIG. 1, while in another example the neural apparatus 200 may correspond to the system 130 of FIG. 1, as non-limiting examples. In addition, the illustrated components of the neural network apparatus of FIG. 2 may also be considered an illustration of components of the training apparatus 100 of FIG. 1, e.g., where the illustrated host, the HW accelerator, and the memory may respectively illustrate the one or more processors, the one or more specialized neural network hardware, and the one or more memories of the training apparatus 100 discussed above. Example embodiments further include the neural network apparatus 200 including components in addition to the components shown in FIG. 2.

The host 210 may perform an overall operation to control the neural network apparatus 200. For example, the host 210 may control an overall operation of the neural network apparatus 200 by executing instructions stored in the memory 220 of the neural network apparatus 200. The host 210 may be implemented as, for example, a central processing unit (CPU), a graphics processing unit (GPU), or an application processor (AP) included in the neural network apparatus 200, but is not limited thereto. Briefly, the host 210 may correspond to the above discussed one or more processors of the inference apparatus 150 (or the system 130) of FIG. 1, the HW accelerator 230 may correspond to the above discussed one or more specialized neural network hardware of the inference apparatus 150 (or the system 130) of FIG. 1, and the memory 220 may correspond to the above discussed one or more memories of the inference apparatus 150 (or the system 130) of FIG. 1. Further, subsequent references to 'processor(s)' should be interpreted as references to both or either of the host 210 (and/or at least the one or more processors discussed above with respect to at least the inference apparatus 150 or system 130 of FIG. 1 and represented by the host 210) and/or the HW accelerator 230 (and/or the one or more specialized neural network hardware discussed above with respect to at least the inference apparatus 150 or system 130 of FIG. 1 and represented by the HW accelerator 230), as non-limiting examples.

As a non-limiting example, the host 210 may generate a neural network for classification and may train the neural network for classification, where the neural network may output an operation result associated with one of plural classes for input data. For example, the neural network for classification may output an operation result indicating respective possibilities that the input data corresponds to each of the plural classes, as respective result values for each of the classes. Also, the neural network may include a softmax layer, e.g., in the trained neural network 110 generated by the training apparatus 100 as well as in the changed/sampled neural networks 160 used in the inference apparatus 150. Such softmax layers may respectively generate probability values based on results of one or more previous (lower) layers of the corresponding neural network. In the training of the neural network by the training apparatus 100 of FIG. 1, the in-training neural network may further include a loss layer that is configured to calculate a loss as an objective operation for further training of the in-training neural network.

As noted above, the memory 220 may be hardware to store a variety of data to be processed, and during processing, in the neural network apparatus 200. For example, the memory 220 may store data processed in the neural network apparatus 200 and data to be processed. Also, the memory 220 may store drivers or applications to be operated by the neural network apparatus 200. The memory 220 may be, for example, a dynamic random-access memory (DRAM), but is not limited thereto. The memory 220 may include, for example, at least one of a volatile memory and a non-volatile memory.

The neural network apparatus 200 may include the HW accelerator 230 for implementing neural network operations of neural networks, e.g., under control by the host 210. The HW accelerator 230 may correspond to, for example, a tensor processing unit (TPU), a neural engine, or a neural processing unit (NPU) which is a dedicated hardware device for an operation of a neural network, but examples are not limited thereto.

Figure 3:
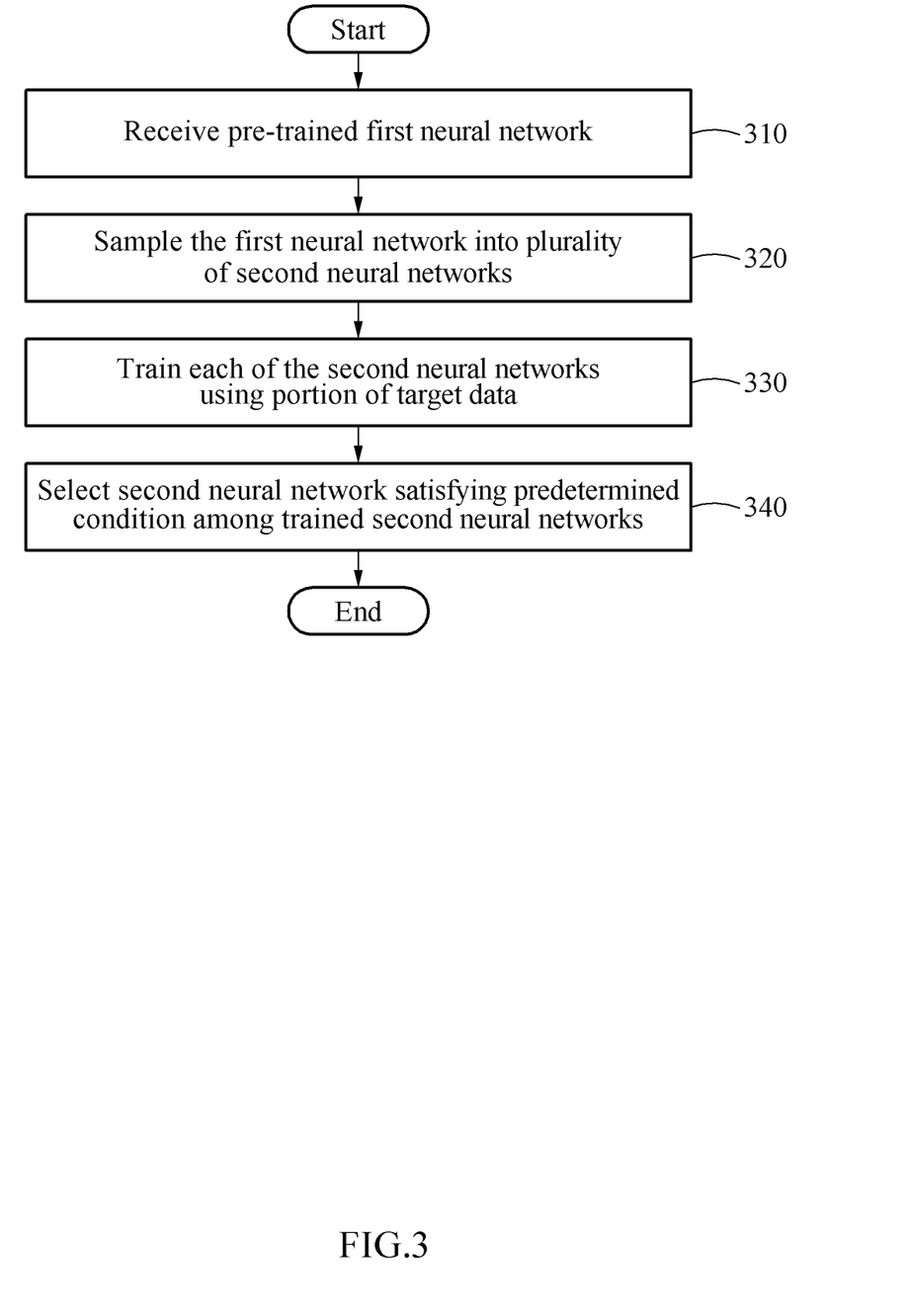
FIG. 3 illustrates an example of a neural architecture search (NAS) method.

FIG. 3 illustrates an example of a neural architecture search (NAS) method.

Referring to FIG. 3, as a non-limiting example, operations 310 to 340 may be performed by the neural network apparatus 200 described above with reference to FIG. 2. The operations in FIG. 3 may be performed in the sequence and manner as shown, although the order of some operations may be changed or some of the operations omitted without departing from the spirit and scope of the illustrative examples described. In an example, one or more operations shown in FIG. 3 may be performed in parallel or concurrently.

An inference device (for example, an NPU or either of the HW accelerator 230 and the neural network apparatus 200 of FIG. 2) may be controlled to perform calculations of a neural network. For example, unit calculations (for example, a convolution operation in 'units' of input tiles) of the neural network are performed based on a determined calculation schedule obtained by allotting when each calculation unit (e.g., Multiple and Accumulate (MAC) operation of a convolution operation) is performed.

In a typical inference implementation of a fixed structure of a trained neural network, the performed calculation units may not change. For example, the fixed structure is determined during training, and may not be changed after the neural network has been trained. Thus, the typical inference implementation merely repeats the same performance of the same calculation units every time the trained neural network with the fixed structure is implemented, resulting in the same performance and energy consumption every implementation.

However, it is found that the target data has various distributions, and that optimization of the structure of a neural network may be performed for target data by dynamically analyzing such distributions, to improve performance and energy consumption when the inference device implements the result of the optimization of the structure of the neural network. Rather, as noted above, it is impossible for the fixed neural network structure typically used in existing technologies to provide such technological improvements provided in one or more embodiments.

For example, the neural network apparatus 200 may change a structure of a trained neural network based on a determined distribution of target data used in the implementation of the neural network, e.g., to reduce energy consumption and/or an operating time of the neural network, as non-limiting examples.

In operation 310, the neural network apparatus 200 may receive a first neural network that is trained in advance. The first neural network (for example, the trained neural network 110 of FIG. 1) may be a neural network trained based on training data labeled in a training apparatus (for example, a server). The first neural network may be a super network trained based on training data having various distributions, e.g., including a search space that may cover the search spaces of the second neural networks (for example, sub-networks) generated by the neural network apparatus 200. The training data used for training may be designed to have a maximum wide distribution by representing input data under various conditions. Thus, typically, the first neural networks may be generated through generalized training to learn based on many different potential inputs or training data, so a broad generalized output may be generated in an ultimate inference implementation of the first neural network.

In operation 320, the neural network apparatus 200 may sample the first neural network into a plurality of second neural networks. For example, the neural network apparatus 200 may sample the first neural network into the plurality of second neural networks using a scheme of randomly setting architecture parameters. The architecture parameters may be parameters indicating importance levels of a plurality of branches making up the first neural network. As non-limiting examples, branches may be respective sequences of layers which temporarily don't have access to "parallel" information that is still passed to later layers, and/or may be implicit branches that can be observed from the distribution of parameters (e.g., weights) or activation values in one or more sequential layers. As another non-limiting example, an in-training neural network initially may have feature information that is organized randomly, e.g., a given feature may be just as likely to be any neuron (activation value) in a layer. Rather, a branching within the trained layer may be observed where features of a given type cluster to one branch, and features of another type cluster in another branch.

In an example, a second neural network (for example, the neural network 160 of FIG. 1) may be a sub-network configured using branches among the plurality of branches making up the first neural network (for example, a super network). In an example, the neural network apparatus 200 may extract "N" second neural networks including different architecture parameters by sampling the first neural network. In an example, the second neural network may be configured using predetermined branches among the plurality of branches, while examples are not limited thereto.

In operation 330, the neural network apparatus 200 may train each of the second neural networks using a portion of target data. The target data may be obtained, e.g., read from a memory of the neural network apparatus 200 in separate target units, multiple target units, or as all target data, as a non-limiting example. For example, the neural network apparatus 200 may train each of "N" second neural networks in a testing phase/time using a portion of target data. The neural network apparatus 200 may use an appropriate second neural network according to a distribution of the used target data, instead of using the first neural network without a change, during an operation of a neural network, and thus a neural network operating time and energy consumption may be reduced.

In an example, the neural network apparatus 200 may train each of the second neural networks in a testing phase/time, e.g., not in a training operation such as performed in the example training apparatus 100 of FIG. 1. In this example, the neural network apparatus 200 may use a portion of the target data, instead of the training data, to train each of the second neural networks. For example, the training of the second neural networks may be performed without labeled data, e.g., labels, corresponding to the target data, and without use or knowledge of training data or the labels of the training data used to train the first neural network.

In an example, the neural network apparatus 200 may train an architecture parameter of each of the second neural networks, using an output obtained by inputting a portion of the target data to each of the second neural networks.

Typically, training is perfumed using labeled training data, which typically requires a memory with a large capacity, because even labeled data needs to be stored. However, since the neural network apparatus 200 in one or more embodiments may not use labeled data corresponding to target data, a capacity of a memory to be used may be less than that of the typical training approaches.

In operation 340, the neural network apparatus 200 may select, from among the trained second neural networks, a second neural network satisfying a predetermined condition. In an example, the neural network apparatus 200 may select a second neural network having a determined high or highest performance while satisfying a given quality condition (for example, a determined minimum or sufficiently minimum classification accuracy), among the trained second neural networks. In another example, the neural network apparatus 200 may select, from among the trained second neural networks, a second neural network that consumes a determined smallest or sufficiently small amount of energy while satisfying a given quality condition (for example, a determined minimum or sufficiently minimum classification accuracy). Such sufficiently minimum and sufficiently small determinations may be based on the respective meetings of respective minimum or small thresholds.

In an example, so the second neural network satisfying a predetermined condition can be determined within a relatively short period of time in operation 340, operation 330 may include the neural network apparatus 200 training each of the second neural networks using a portion of the target data, instead of using all the target data. Thus, in operation 340, the neural network apparatus 200 may select the second neural network determined suitable or most suitable for the target data. The determination of suitability may be based on whether a second neural network meets a suitability threshold.

In an example, operation 340 may further include the neural network apparatus 200 training the selected second neural network based on the target data. For example, the neural network apparatus 200 may determine the first neural network to be a teacher network and may determine the selected second neural network to be a student network. Subsequently, the neural network apparatus 200 may perform teacher learning on the selected second neural network based on the first neural network to generate a final second neural network. Here, while the illustrated changed/sampled neural networks 160 of FIG. 1 are discussed with respect to the trained second neural networks, the illustrated neural network 160 of FIG. 1 may alternatively represent the final trained neural network.

Figure 4:
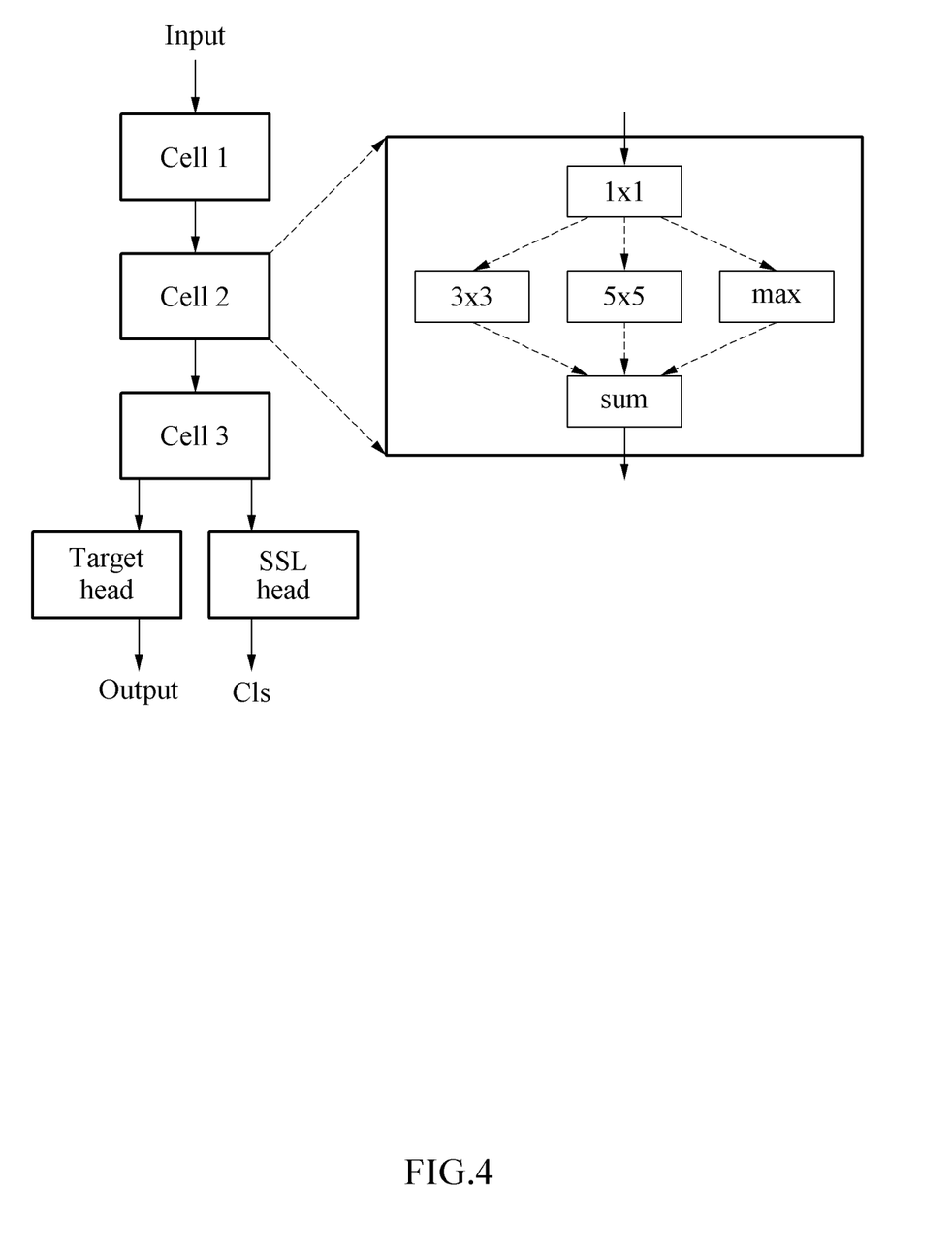
FIG. 4 illustrates an example of training a second neural network by applying self-supervised learning.

FIG. 4 illustrates an example of training a second neural network by applying self-supervised learning.

Referring to FIG. 4, a neural network apparatus 200 may sample a first neural network using one or two of three branches (for example, a 3×3 branch, a 5×5 branch, and a max branch) included in a second cell of the first neural network, instead of using all the three branches.

In an example, a second neural network may include a first cell, a second cell, a third cell, a target head, and a self-supervised learning head (hereinafter, referred to as an "SSL head").

The neural network apparatus 200 may include an SSL head to perform a self-supervised learning task. In an example, because labels are automatically generated, rather than having to spend time to separately prepare the labels, e.g., by a human designer, the self-supervised learning task may be applied to arbitrary target data whose labels may be unknown. For example, such arbitrary target data may be an example of unlabeled target data. The self-supervised learning task may include, for example, a rotation task, or a jigsaw task. The rotation task may be a task of rotating an input image by one of four types of rotations (for example, 0-degree, 90-degree, 180-degree, and 270-degree rotations) and estimating the type of rotation.

The neural network apparatus 200 may train an architecture parameter of each of second neural networks based on a result obtained by performing the self-supervised learning task. For example, the neural network apparatus 200 may configure a trunk (for example, a portion including the first cell, the second cell and the third cell of FIG. 4) of a sub-network (for example, a second neural network) of a sampled super network (for example, a first neural network), and may train a trunk portion of the sub-network using an output of the SSL head. For example, when a rotation task is used, the trunk portion of the sub-network may be trained using a cross-entropy loss.

The neural network apparatus 200 may evaluate sub-networks that are trained using a portion of target data as test data, and may select a sub-network satisfying a predetermined condition (for example, having a determined high or highest performance among sub-networks satisfying a quality condition) through the above evaluation. The determination of high performance may be based on whether the sub-network meets a performance threshold.

The neural network apparatus 200 may additionally train the selected second neural network using the target data. The neural network apparatus 200 may consider the first neural network the teacher network and consider the selected second neural network the student network. Subsequently, the neural network apparatus 200 may perform teacher learning on the selected second neural network based on the first neural network.

Figure 5A:
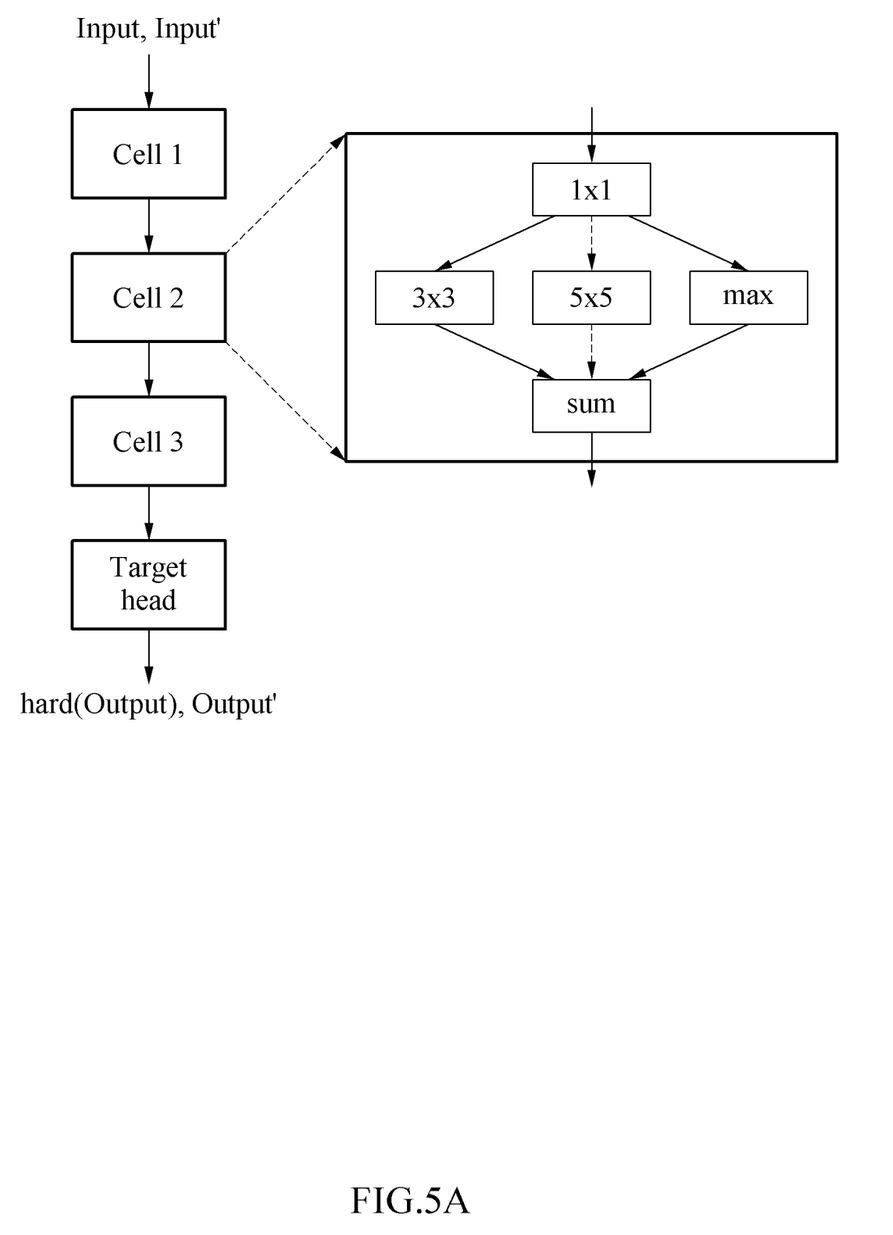
FIG. 5A illustrates an example of training a second neural network by applying semi-supervised learning.

FIG. 5A illustrates an example of training a second neural network by applying semi-supervised learning.

Referring to FIG. 5A, a neural network apparatus 200 may include a first cell, a second cell, a third cell, and a target head.

The neural network apparatus 200 may obtain a network output (for example, an output of FIG. 5A), using given input target data (for example, an input of FIG. 5A) without a change, or using data to which weak augmentation (for example, first augmentation) is applied, and may obtain a class result (for example, hard(Output) of FIG. 5A) obtained by applying a hard decision to the output. For example, when a classification task is performed, the neural network apparatus 200 may perform a hard decision by assigning a probability of "1" to a maximum probability class output and assigning a probability of "0" to the other class outputs.

Also, the neural network apparatus 200 may train a second neural network so that a cross-entropy between a network output (for example, an output' of FIG. 5A) and a hard decision result may be determined maximized or sufficiently high based on a predetermined threshold. The network output may be obtained using, as an input, data (for example, an input' of FIG. 5A) obtained by applying stronger augmentation (for example, second augmentation with a stronger degree of augmentation than the first augmentation) to the same input target data.

The neural network apparatus 200 may evaluate second neural networks that are trained using a portion of target data as test data, and may select a second neural network satisfying a predetermined condition (for example, having a determined high or highest performance among second neural networks satisfying a quality condition) through the above evaluation. The determination of high performance may be based on whether the second neural network meets a performance threshold for satisfying the quality condition.

The neural network apparatus 200 may additionally train the selected second neural network using the target data. The neural network apparatus 200 may consider the first neural network the teacher network and consider the selected second neural network the student network. Subsequently, the neural network apparatus 200 may perform teacher learning on the selected second neural network based on the first neural network.

Figure 5B:
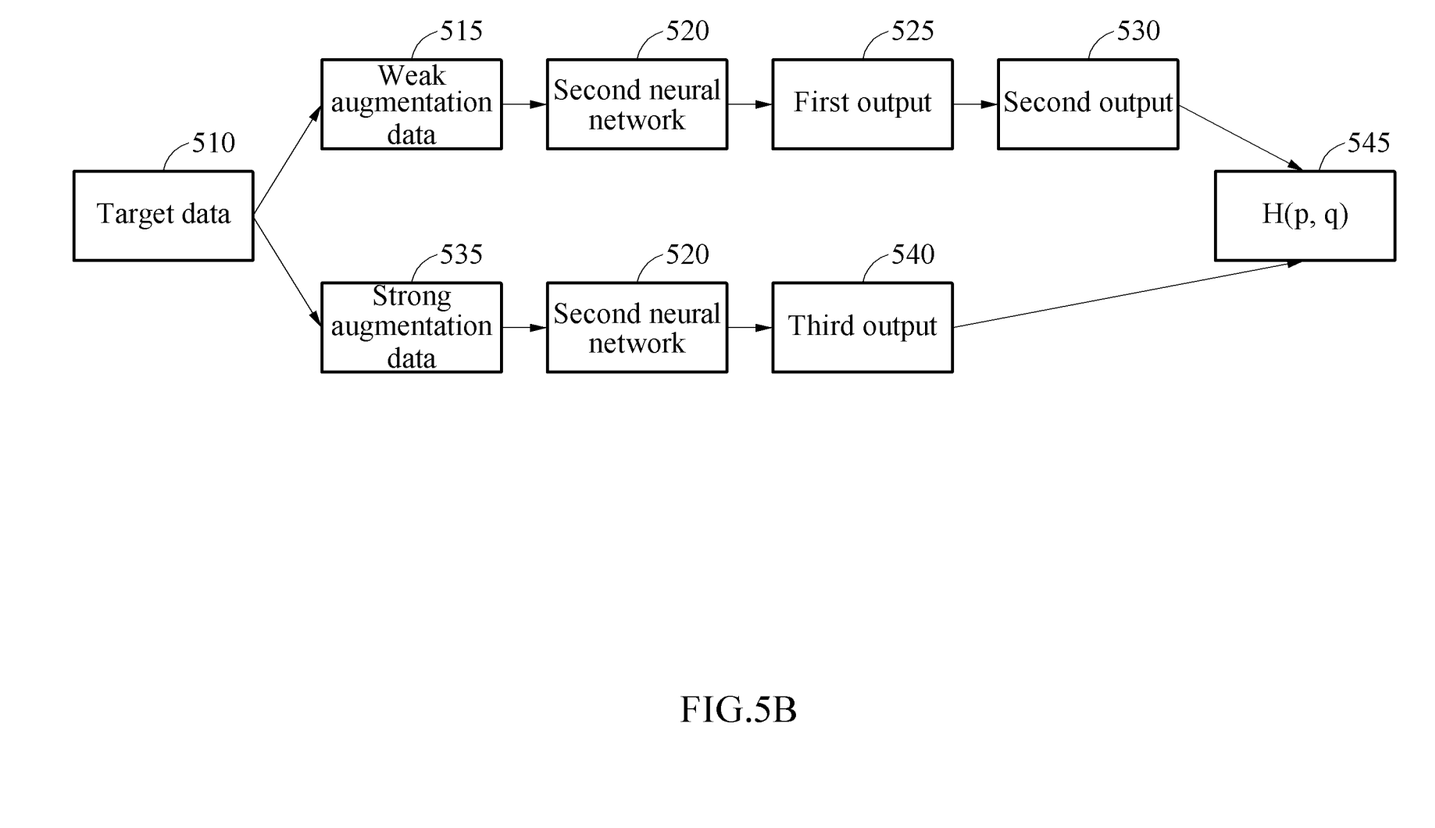
FIG. 5B illustrates an example of training a second neural network based on FixMatch.

FIG. 5B illustrates an example of training a second neural network based on FixMatch.

Referring to FIG. 5B, semi-supervised learning may include FixMatch, as a non-limiting example.

The neural network apparatus 200 may train a second neural network 520 without labeled data corresponding to a given input target data 510 being used or known. The neural network apparatus 200 may obtain a first output 525 using data 515 obtained by applying weak augmentation (for example, first augmentation) to the input target data 510, and may obtain a second output 530 by performing a hard decision on the first output 525.

Also, the neural network apparatus 200 may obtain a third output 540 using data 535 obtained by applying stronger augmentation (for example, second augmentation with a stronger degree of augmentation than the first augmentation) to the input target data 510, and may train the second neural network 520 so that a cross-entropy 545 between the second output 530 and the third output 540 may be determined maximized or sufficiently high based on a predetermined threshold.

The apparatuses, processors, memories, or specialized neural network hardware, hardware (HW) accelerator, central processing unit (CPU), a graphics processing unit (GPU), or an application processor (AP), tensor processing unit (TPU), neural engine, or neural processing unit (NPU), devices, and other components described herein, e.g., with respect to FIGS. 1-5B, are implemented by hardware components. Examples of hardware components that may be used to perform the operations described in this application where appropriate include controllers, sensors, generators, drivers, memories, comparators, arithmetic logic units, adders, subtractors, multipliers, dividers, integrators, and any other electronic components configured to perform the operations described in this application. In other examples, one or more of the hardware components that perform the operations described in this application are implemented by computing hardware, for example, by one or more processors or computers. A processor or computer may be implemented by one or more processing elements, such as an array of logic gates, a controller and an arithmetic logic unit, a digital signal processor, a microcomputer, a programmable logic controller, a field-programmable gate array, a programmable logic array, a microprocessor, or any other device or combination of devices that is configured to respond to and execute instructions in a defined manner to achieve a desired result. In one example, a processor or computer includes, or is connected to, one or more memories storing instructions or software that are executed by the processor or computer. Hardware components implemented by a processor or computer may execute instructions or software, such as an operating system (OS) and one or more software applications that run on the OS, to perform the operations described in this application. The hardware components may also access, manipulate, process, create, and store data in response to execution of the instructions or software. For simplicity, the singular term "processor" or "computer" may be used in the description of the examples described in this application, but in other examples multiple processors or computers may be used, or a processor or computer may include multiple processing elements, or multiple types of processing elements, or both. For example, a single hardware component or two or more hardware components may be implemented by a single processor, or two or more processors, or a processor and a controller. One or more hardware components may be implemented by one or more processors, or a processor and a controller, and one or more other hardware components may be implemented by one or more other processors, or another processor and another controller. One or more processors, or a processor and a controller, may implement a single hardware component, or two or more hardware components. A hardware component may have any one or more of different processing configurations, examples of which include a single processor, independent processors, parallel processors, single-instruction single-data (SISD) multiprocessing, single-instruction multiple-data (SIMD) multiprocessing, multiple-instruction single-data (MISD) multiprocessing, and multiple-instruction multiple-data (MIMD) multiprocessing.

The methods of FIGS. 1-5B that perform the operations described in this application are performed by computing hardware, for example, by one or more processors or computers, implemented as described above executing instructions or software to perform the operations described in this application that are performed by the methods. For example, a single operation or two or more operations may be performed by a single processor, or two or more processors, or a processor and a controller. One or more operations may be performed by one or more processors, or a processor and a controller, and one or more other operations may be performed by one or more other processors, or another processor and another controller. One or more processors, or a processor and a controller, may perform a single operation, or two or more operations.

Instructions or software to control computing hardware, for example, one or more processors or computers, as well as one or more systolic arrays in combination therewith as a non-limiting example, to implement the hardware components and perform the methods as described above may be written as computer programs, code segments, instructions or any combination thereof, for individually or collectively instructing or configuring the one or more processors or computers to operate as a machine or special-purpose computer to perform the operations that are performed by the hardware components and the methods as described above. In one example, the instructions or software include machine code that is directly executed by the one or more processors or computers, such as machine code produced by a compiler. In another example, the instructions or software includes higher-level code that is executed by the one or more processors or computer using an interpreter. The instructions or software may be written using any programming language based on the block diagrams and the flow charts illustrated in the drawings and the corresponding descriptions used herein, which disclose algorithms for performing the operations that are performed by the hardware components and the methods as described above.

The instructions or software to control computing hardware, for example, one or more processors or computers, as well as one or more systolic arrays in combination therewith, to implement the hardware components and perform the methods as described above, and any associated data, data files, and data structures, may be recorded, stored, or fixed in or on one or more non-transitory computer-readable storage media. Examples of a non-transitory computer-readable storage medium include read-only memory (ROM), random-access programmable read only memory (PROM), electrically erasable programmable read-only memory (EEPROM), random-access memory (RAM), dynamic random access memory (DRAM), static random access memory (SRAM), flash memory, non-volatile memory, CD-ROMs, CD-Rs, CD+Rs, CD-RWs, CD+RWs, DVD-ROMs, DVD-Rs, DVD+Rs, DVD-RWs, DVD+RWs, DVD-RAMs, BD-ROMs, BD-Rs, BD-R LTHs, BD-REs, blue-ray or optical disk storage, hard disk drive (HDD), solid state drive (SSD), flash memory, a card type memory such as multimedia card micro or a card (for example, secure digital (SD) or extreme digital (XD)), magnetic tapes, floppy disks, magneto-optical data storage devices, optical data storage devices, hard disks, solid-state disks, and any other device that is configured to store the instructions or software and any associated data, data files, and data structures in a non-transitory manner and provide the instructions or software and any associated data, data files, and data structures to one or more processors or computers so that the one or more processors or computers can execute the instructions. In one example, the instructions or software and any associated data, data files, and data structures are distributed over network-coupled computer systems so that the instructions and software and any associated data, data files, and data structures are stored, accessed, and executed in a distributed fashion by the one or more processors or computers.

While this disclosure includes specific examples, it will be apparent after an understanding of the disclosure of this application that various changes in form and details may be made in these examples without departing from the spirit and scope of the claims and their equivalents. The examples described herein are to be considered in a descriptive sense only, and not for purposes of limitation. Descriptions of features or aspects in each example are to be considered as being applicable to similar features or aspects in other examples. Suitable results may be achieved if the described techniques are performed in a different order, and/or if components in a described system, architecture, device, or circuit are combined in a different manner, and/or replaced or supplemented by other components or their equivalents.

What is claimed is:

1. A processor-implemented method, the method comprising:
    obtaining target data;
    sampling a trained first neural network into a plurality of second neural networks,
    wherein the sampling comprises randomly extracting architecture parameters for a plurality of sub-networks of the second neural network;
    training each of the second neural networks based on a portion of the target data, wherein the training of each of the second neural networks comprises training an architecture parameter of each of the second neural networks using respective outputs obtained by inputting the portion of the target data to each of the second neural networks;
    selecting a second neural network satisfying a predetermined condition among the trained second neural networks for performing an inference operation; and
    performing the inference operation on the target data using the selected second neural network to output an operation result based on the target data.

2. The method of claim 1, further comprising:
    training the selected second neural network based on the target data.

3. The method of claim 2, wherein the training of the selected second neural network comprises training the selected second neural network using the first neural network.

4. The method of claim 3, further comprising implementing the inference operation using the trained selected second neural network.

5. The method of claim 3, wherein the training of the selected second neural network using the first neural network comprises:
    performing teacher learning on the selected second neural network based on the first neural network by using the first neural network as a teacher network and using the selected second neural network as a student network.

6. The method of claim 1, wherein the training of each of the second neural networks comprises training each of the second neural networks without labels corresponding to the target data.

7. The method of claim 1, wherein the training of each of the second neural networks comprises:
    performing a self-supervised learning task on each of the second neural networks using the portion of the target data,
    wherein the training the architecture parameter of each of the second neural networks is based on respective results obtained by performing the self-supervised learning task.

8. The method of claim 1, wherein the training of each of the second neural networks comprises:
    performing a semi-supervised learning task on each of the second neural networks using the portion of the target data,
    wherein the training the architecture parameter of each of the second neural networks is based on respective results obtained by performing the semi-supervised learning task.

9. The method of claim 1, wherein the training of each of the second neural networks comprises:
    performing a self-supervised learning task on at least one of the second neural networks using the portion of the target data,
    wherein the training the architecture parameter of the at least one of the second neural networks is based on respective results obtained by performing the self-supervised learning task; and
    performing a semi-supervised learning task on another at least one of the second neural networks using the portion of the target data, wherein the training the architecture parameter of another at least one of the second neural networks based on respective results obtained by performing the semi-supervised learning task.

10. The method of claim 1, wherein the selecting of the second neural network comprises:
classifying which one or more second neural networks satisfy a quality condition among the trained second neural networks;
evaluating the one or more second neural networks that satisfy the quality condition based on at least one of a performance condition and an energy consumption condition;
and selecting the second neural network based on a result of the evaluating.

11. The method of claim 1, further comprising, using one or more processors, executing instructions that cause the one or more processors to obtain the target data and the trained first neural network from one or more memories, perform the sampling of the trained first neural network, perform the training of each of the second neural networks, and perform the selecting of the second neural network.

12. The method of claim 11, further comprising implementing the inference operation using the selected second neural network.

13. A non-transitory computer-readable storage medium storing instructions that, when executed by one or more processors, cause the one or more processors to perform the method of claim 1.

14. A neural network apparatus comprising:
one or more processors configured to:
obtain target data;
sample a trained first neural network into a plurality of second neural networks, wherein the sampling comprises randomly extracting architecture parameters for a plurality of sub-networks of the second neural network;
train each of the second neural networks based on a portion of the target data, wherein, for the training of each of the second neural networks, the one or more processors are configured to train an architecture parameter of each of the second neural networks using respective outputs obtained by inputting the portion of the target data to each of the second neural networks;
perform a selection, from among the trained second neural networks, of a second neural network that satisfies a predetermined condition for performing an inference operation; and
performing the inference operation on the target data using the selected second neural network to output an operation result based on the target data.

15. The apparatus of claim 14, wherein the one or more processors are further configured to train the selected second neural network based on the target data.

16. The apparatus of claim 15, wherein, for the training of the selected second neural network, the one or more processors are configured to train the selected second neural network using the first neural network.

17. The apparatus of claim 16, further comprising implementing the inference operation using the trained selected second neural network.

18. The apparatus of claim 16, wherein, for the training of the selected second neural network using the first neural network, the one or more processors are configured to perform teacher learning on the selected second neural network based on the first neural network by using the first neural network as a teacher network and using the selected second neural network as a student network.

19. The apparatus of claim 14, wherein, for the training of each of the second neural networks, the one or more processors are configured to train each of the second neural networks without labels corresponding to the target data.

20. The apparatus of claim 14, wherein, for the training of each of the second neural networks, the one or more processors are configured to perform a self-supervised learning task on each of the second neural networks using the portion of the target data,
wherein the training the architecture parameter of each of the second neural networks is based on respective results obtained by performing the self-supervised learning task.

21. The apparatus of claim 14, wherein, for the training of each of the second neural networks, the one or more processors are configured to perform a semi-supervised learning task on each of the second neural networks using the portion of the target data,
wherein the training the architecture parameter of each of the second neural networks is based on respective results obtained by performing the semi-supervised learning task.

22. The apparatus of claim 14, wherein, for the training of each of the second neural networks, the one or more processors are configured to:
perform a self-supervised learning task on at least one of the second neural networks using the portion of the target data, wherein the training the architecture parameter of the at least one of the second neural networks is based on respective results obtained by performing the self-supervised learning task; and
perform a semi-supervised learning task on another at least one of the second neural networks using the portion of the target data,
wherein the training the architecture parameter of another at least one of the second neural networks is based on respective results obtained by performing the semi-supervised learning task.

23. The apparatus of claim 14, wherein, for the selection of the second neural network, the one or more processors are configured to classify which one or more second neural networks satisfy a quality condition among the trained second neural networks, to evaluate the second neural networks satisfying the quality condition based on at least one of a performance condition and an energy consumption condition, and to select the second neural network based on a result of the evaluation.

24. The apparatus of claim 14, further comprising one or more memories, including at least one of the one or more memories storing instructions, which when executed by the one or more processors, configure the one or more processors to obtain the target data and the trained first neural network from at least one of the one or more memories, perform the sampling of the trained first neural network, perform the training of each of the second neural networks, and perform the selecting of the second neural network.

25. The apparatus of claim 23, wherein the stored instructions, which when executed by the one or more processors, configure the one or more processors to implement the inference operation using the selected second neural network, where the inference operation is a classification of information about image data input to the selected second neural network.

26. The apparatus of claim 14, wherein the apparatus is a mobile device.

27. A mobile device comprising:

one or more processors; and one or more memories comprising instructions, which when executed by the one or more processors, configure the one or more processors to:

sample a trained first neural network into a plurality of second neural networks, wherein the sampling comprises randomly extracting architecture parameters for a plurality of sub-networks of the second neural network;

train each of the second neural networks based on a portion of unlabeled target image data;

train an architecture parameter of each of the second neural networks using respective outputs obtained by inputting the portion of the unlabeled target image data to each of the second neural networks;

perform a selection, from among the trained second neural networks, of a second neural network;

generate a final second neural network by training the selected second neural network using the first neural network and the unlabeled target data; and perform an inference operation on the target image data using the generated final second neural network to output an operation result based on the unlabeled target data.

28. The mobile device of claim 27, wherein the one or more processors are further configured to implement an inference operation using the generated final second neural network, where the inference operation is a classification of information about image data input to the final second neural network.

29. The mobile device of claim 28, wherein, for the training of the selected second neural network using the first neural network, the one or more processors are configured to perform teacher learning on the selected second neural network based on the first neural network by using the first neural network as a teacher network and using the selected second neural network as a student network.

30. The mobile device of claim 27, wherein, for the training of each of the second neural networks, the one or more processors are configured to perform a self-supervised learning task on each of the second neural networks using the portion of the target data, wherein the training the architecture parameter of each of the second neural networks is based on respective results obtained by performing the self-supervised learning task.

31. The mobile device of claim 27, wherein, for the training of each of the second neural networks, the one or more processors are configured to perform a semi-supervised learning task on each of the second neural networks using the portion of the target data, wherein the training the architecture parameter of each of the second neural networks is based on respective results obtained by performing the semi-supervised learning task.

32. The mobile device of claim 27, wherein, for the selection of the second neural network, the one or more processors are configured to classify second neural networks satisfying a quality condition among the trained second neural networks, to evaluate the second neural networks satisfying the quality condition based on at least one of a performance condition and an energy consumption condition, and to select the second neural network based on a result of the evaluation.

33. The method of claim 1, wherein the target data is unlabeled image data comprising images, and wherein the inference operation is a classification operation performed on the unlabeled image data to classify an image of the unlabeled image data.

34. The method of claim 1, wherein the target data is image data comprising images, and wherein the inference operation is an image enhancement performed on the image data to enhance an image of the image data.

* * * * *

UNITED STATES PATENT AND TRADEMARK OFFICE
CERTIFICATE OF CORRECTION

| | | |
|---|---|---|
| PATENT NO. | : 12,412,098 B2 | Page 1 of 1 |
| APPLICATION NO. | : 17/384050 | |
| DATED | : September 9, 2025 | |
| INVENTOR(S) | : Sungjoo Yoo | |

It is certified that error appears in the above-identified patent and that said Letters Patent is hereby corrected as shown below:

On the Title Page

Item (54) Title and in the Specification, Column 1, Lines 1-3, should read:
APPARATUS AND METHOD FOR NEURAL ARCHITECTURE SEARCHING WITH TARGET DATA ADAPTION Signed and Sealed this
Sixth Day of January, 2026

John A. Squires
*Director of the United States Patent and Trademark Office*